(12) United States Patent
Smith et al.

(10) Patent No.: US 12,104,891 B1
(45) Date of Patent: Oct. 1, 2024

(54) SPATIALLY FILTERED TALBOT INTERFEROMETER FOR WAFER DISTORTION MEASUREMENT

(71) Applicant: Nikon Corporation, Tokyo (JP)

(72) Inventors: Daniel Gene Smith, Tucson, AZ (US); Goldie Lynne Goldstein, Tucson, AZ (US); Hidemitsu Toba, Yokohama (JP); Shunsuke Kibayashi, Tokyo (JP); Katsura Otaki, Kamakura (JP); Eric Peter Goodwin, Oro Valley, AZ (US)

( * ) Notice: Subject to any disclaimer, the term of this patent is extended or adjusted under 35 U.S.C. 154(b) by 0 days.

(21) Appl. No.: 16/989,157

(22) Filed: Aug. 10, 2020

Related U.S. Application Data

(60) Provisional application No. 62/885,596, filed on Aug. 12, 2019.

(51) Int. Cl.
*G01B 11/16* (2006.01)
*G01B 9/02* (2022.01)
(Continued)

(52) U.S. Cl.
CPC ........ *G01B 11/161* (2013.01); *G01B 9/02024* (2013.01); *G01B 9/02041* (2013.01);
(Continued)

(58) Field of Classification Search
CPC . G01B 11/161; G01B 11/167; G01B 11/2441; G01B 9/02024; G01B 9/02041; G01B 2290/30
See application file for complete search history.

(56) References Cited

U.S. PATENT DOCUMENTS

| | | | | |
|---|---|---|---|---|
| 5,489,986 A | * | 2/1996 | Magome | ................... G03F 9/70 |
| | | | | 356/401 |
| 5,610,684 A | * | 3/1997 | Shiraishi | ............. G03F 7/70241 |
| | | | | 355/53 |

(Continued)

FOREIGN PATENT DOCUMENTS

WO    2018156702    8/2018

OTHER PUBLICATIONS

Bruning et al. "Digital wavefront measuring interferometer for testing optical surfaces and lenses." Applied optics 13.11 (1974): 2693-2703.

(Continued)

*Primary Examiner* — Violeta A Prieto

(57) ABSTRACT

A system for measuring a target grating includes an illumination source, a reference transmission grating, a pupil filter, and a detector. The illumination source is disposed to generate an incident light beam that illuminates the reference transmission grating. The reference transmission grating splits the incident light beam into a plurality of diffraction orders. The plurality of diffraction orders interrogates a target grating. The reference transmission grating and the target grating are parallel. The pupil filter allows transmission of a subset of diffraction orders of light that has been diffracted and/or reflected from the target grating after being split again by passing through the reference transmission grating. The detector takes a measurement of the subset of diffraction orders of light after transmission through the pupil filter.

33 Claims, 16 Drawing Sheets

(51) Int. Cl.
  *G01B 9/02015* (2022.01)
  *G01B 11/24* (2006.01)
(52) U.S. Cl.
  CPC ........ *G01B 11/167* (2013.01); *G01B 11/2441* (2013.01); *G01B 2290/30* (2013.01)

(56) References Cited

U.S. PATENT DOCUMENTS

| | | | | |
|---|---|---|---|---|
| 5,627,626 | A * | 5/1997 | Inoue | G03F 7/70333 355/71 |
| 5,677,757 | A * | 10/1997 | Taniguchi | G03F 7/70308 355/71 |
| 5,734,478 | A * | 3/1998 | Magome | G03F 9/7049 250/548 |
| 6,118,516 | A * | 9/2000 | Irie | G03F 7/70333 355/53 |
| 6,304,317 | B1 * | 10/2001 | Taniguchi | G03F 7/701 355/53 |
| 7,336,371 | B1 * | 2/2008 | Haidner | G03F 7/706 356/515 |
| 8,786,825 | B2 * | 7/2014 | Van De Kerkhof | G01N 21/956 355/53 |
| 9,995,919 | B2 * | 6/2018 | Schwertner | G02B 21/06 |
| 10,677,588 | B2 * | 6/2020 | Hill | G03F 7/70641 |
| 11,346,657 | B2 * | 5/2022 | Manassen | G03F 7/706849 |
| 2002/0008863 | A1 * | 1/2002 | Taniguchi | G03F 7/701 355/55 |
| 2003/0128370 | A1 * | 7/2003 | De Lega | G02B 5/1871 356/521 |
| 2004/0245439 | A1 * | 12/2004 | Shaver | G03F 7/70566 250/225 |
| 2006/0197933 | A1 * | 9/2006 | Kawashima | G03F 7/70283 355/53 |
| 2009/0001260 | A1 * | 1/2009 | Klaver | G01D 5/38 250/237 G |
| 2009/0168158 | A1 * | 7/2009 | Schwertner | G02B 21/0024 359/370 |
| 2009/0284727 | A1 * | 11/2009 | Muramatsu | G03F 7/70141 355/71 |
| 2013/0222781 | A1 * | 8/2013 | Watanabe | G03F 7/70291 355/71 |
| 2013/0329284 | A1 * | 12/2013 | Schwertner | G02B 21/0024 359/385 |
| 2014/0177044 | A1 * | 6/2014 | Schwertner | G02B 21/0024 359/385 |
| 2017/0363411 | A1 * | 12/2017 | Nagahama | G01B 9/02015 |
| 2018/0173089 | A1 * | 6/2018 | Lu | G03F 7/70033 |
| 2019/0041621 | A1 * | 2/2019 | Schwertner | G02B 21/14 |
| 2019/0121228 | A1 * | 4/2019 | Lu | G03F 7/70191 |
| 2020/0124408 | A1 * | 4/2020 | Hill | G01N 21/9505 |
| 2020/0232786 | A1 * | 7/2020 | Smith | G02B 27/50 |
| 2021/0333218 | A1 * | 10/2021 | Feler | G03F 7/70633 |
| 2021/0364279 | A1 * | 11/2021 | Manassen | G03F 7/706849 |

OTHER PUBLICATIONS

Takeda et al. "Fourier-transform method of fringe-pattern analysis for computer-based topography and interferometry." JosA 72.1 (1982): 156-160.

* cited by examiner

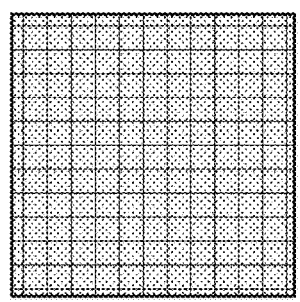 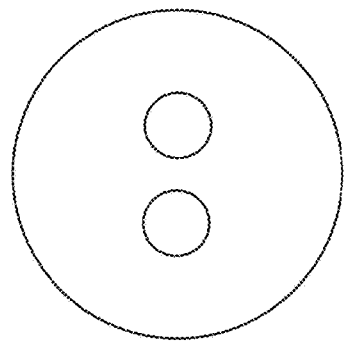 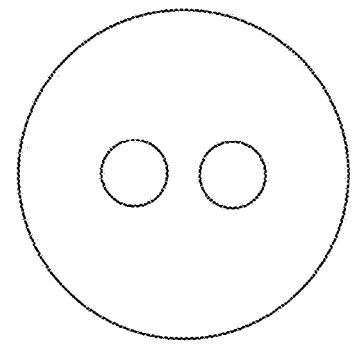
Grating　　　Pupil-X　　　Pupil-Y
FIG. 9A
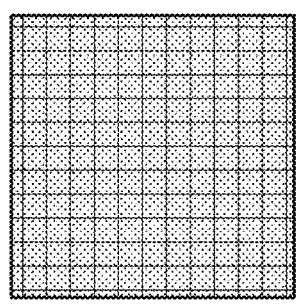 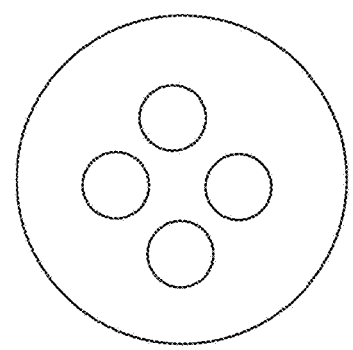
Grating　　　Pupil
FIG. 9B
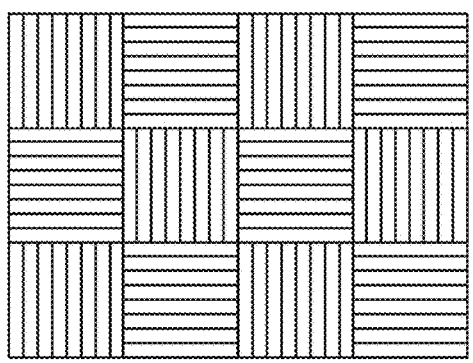 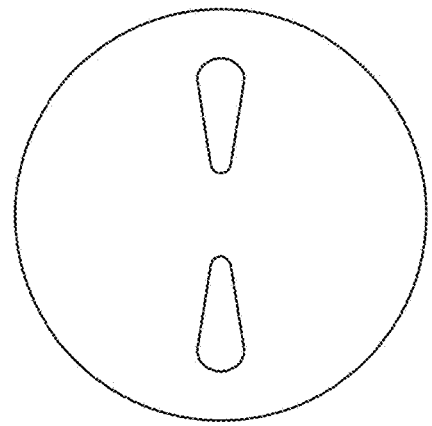
Grating　　　Pupil
FIG. 9C　　　FIG. 9D

SPATIALLY FILTERED TALBOT INTERFEROMETER FOR WAFER DISTORTION MEASUREMENT

CROSS REFERENCE TO OTHER APPLICATIONS

This application claims priority to U.S. Provisional Patent Application No. 62/885,596 entitled SPATIALLY FILTERED TALBOT INTERFEROMETER FOR WAFER DISTORTION MEASUREMENT filed Aug. 12, 2019 which is incorporated herein by reference for all purposes.

BACKGROUND OF THE INVENTION

Semiconductor devices have become increasingly denser, and with it, stricter requirements on the accuracy of wafer pattern overlay. The accuracy depends on several factors including distortion of the optical system, stage position control errors, and distortion of the wafer itself. The wafer, when secured with a chuck mechanism, not only distorts slightly in flatness, but also contracts or expands. These in-plane distortions due to contraction and expansion need to be measured accurately to control them.

BRIEF DESCRIPTION OF THE DRAWINGS

Various embodiments of the invention are disclosed in the following detailed description and the accompanying drawings.

FIGS. 9A, 9B, 9C, 9D, 9E, 9F, and 9G illustrate embodiments of combinations of different types of gratings and pupil filters.

DETAILED DESCRIPTION

Figure 1:
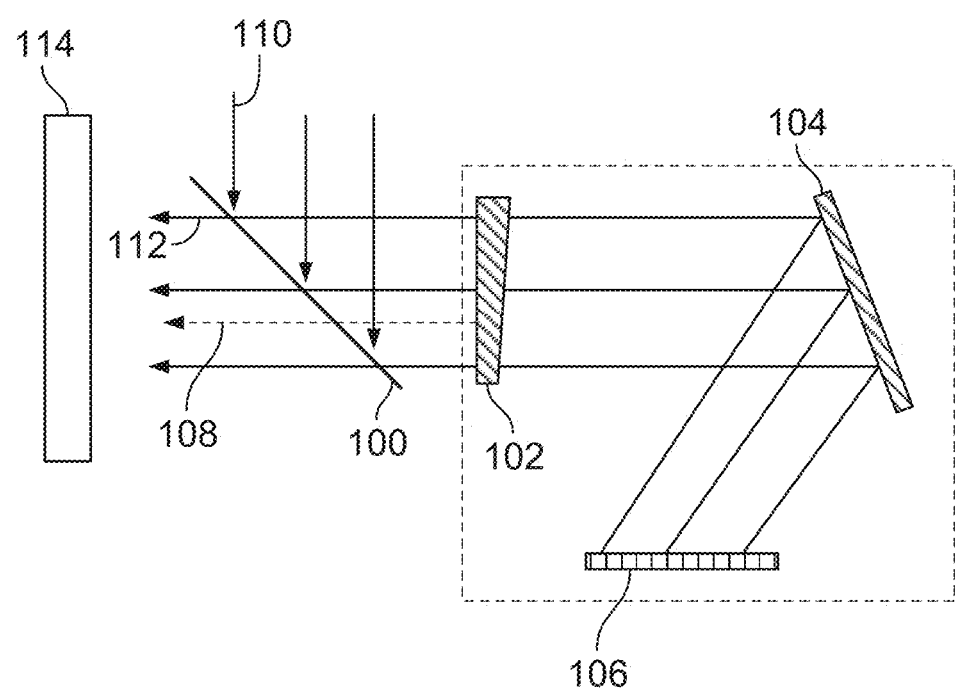
FIG. 1 is a diagram illustrating an embodiment of a Fizeau interferometer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for wafer distortion measurement is disclosed. The system includes an illumination source, a reference transmission grating, a pupil filter, and a detector. The illumination source is disposed to generate an incident light beam that illuminates the reference transmission grating. The reference transmission grating splits the incident light beam into a plurality of diffraction orders. The plurality of diffraction orders interrogates a target grating. The reference transmission grating and the target grating are parallel. The pupil filter allows transmission of a subset of diffraction orders of light that has been diffracted and/or reflected from the target grating after being split again by passing through the reference transmission grating. The detector takes a measurement of the subset of diffraction orders of light after transmission through the pupil filter.

A conventional distortion measurement method uses a laser distance measurement device to measure wafer distortions point-by-point. The wafer has alignment marks at various locations that are imaged by a camera, and their distortion-induced position shifts are measured by image processing. The position of each mark is controlled based on laser distance measurement. This method requires a long measurement time for a large—such as 12-inch—wafer, so it is limited to discrete measurement points. The distortions between the points can only be estimated. For example, if the measurement pitch is 10 mm, there is no position data available to determine distortions between these points. Therefore, the distortions are estimated by interpolation assuming they are changing smoothly.

In some embodiments, the system for wafer distortion measurement is a part of a lithography system. For example, the system for wafer distortion measurement measures wafer distortion prior to, during, and/or after the lithography production of a structure on the surface of a wafer. In some embodiments, the distortion measurement is used to determine whether or not to proceed with production (e.g., the distortion is lower than a threshold amount). In some embodiments, the wafer is unclamped and reclamped in a chuck and then remeasured to determine whether the distortion is below a threshold. In some embodiments, the wafer distortion measurement system is used as an alignment device in a lithography system. In some embodiments, the wafer distortion measurement is performed in a separate optical setup from the lithographic setup but using the same wafer chuck and wafer as is to be exposed for lithography. In some embodiments, system is used as an alignment device in a lithography system. In some embodiments, the wafer distortion measurement is performed in a separate optical setup from the lithographic setup but using the same wafer chuck and wafer as is to be exposed for lithography. In some embodiments, the wafer distortion measurement is performed in the same optical setup as the lithographic setup using the same wafer chuck and wafer as is to be exposed for lithography, where the transmission grating is inserted into the optical train of the lithography setup for the wafer distortion measurement and then removed for the lithography. In some embodiments, additional optical elements (e.g., a minor, lenses, filters, etc.) are inserted in the lithographic setup in addition to the transmission grating for the wafer distortion measurement.

In some embodiments, the target grating is a grating that is formed on the surface of a wafer. In some embodiments, the target grating is formed on a portion of the surface of a wafer. In some embodiments, the target grating is formed on a street line of the wafer.

FIG. 1 is a diagram illustrating an embodiment of a Fizeau interferometer. In the example shown, the components for a Fizeau interferometer are displayed. Wafer distortions can be measured using a Fizeau interferometer based on the phase of the wafer grating observed through an interferometric image (e.g., interferogram) of light diffracted off the grating and a Fizeau surface. For example, incident light 110 is reflected off of beam splitter 100 and is transmitted and reflected from Fizeau surface 102. The transmitted beam is reflected from minor 104 and diffracted from target grating 106 to travel back toward minor 104 and Fizeau surface 102. Reflected beam 108 from Fizeau surface 102 interferes with beam 112 from target grating 106 to generate an interferometric image that is measured using detector 114 (e.g., a charge-coupled device (CCD) or a complementary metal-oxide semiconductor (CMOS) sensor). This method can provide denser measurements compared to the laser distance measurement method; however, the large space between the optical system and the test surface makes it more sensitive to air fluctuations. As a result, the measurement has repeatability issues. In addition, the system requires a long time to stabilize after a test wafer is placed before a measurement can be taken.

The disclosed system provides method for simultaneously measuring of the surface of a wafer at high density without being affected by air fluctuations.

Figure 2:
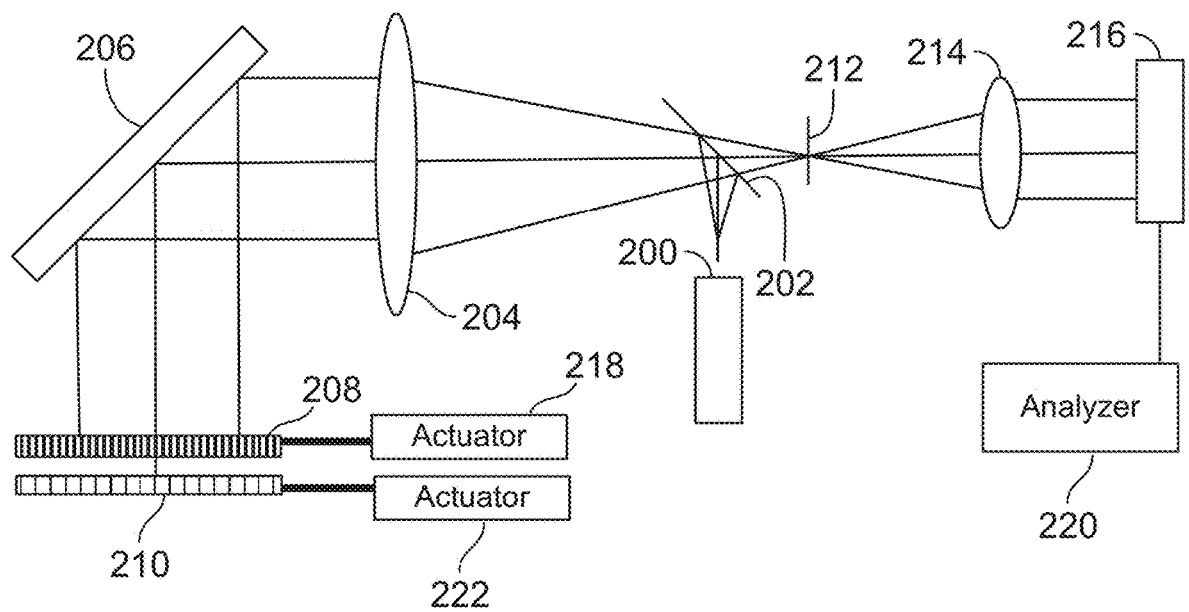
FIG. 2 is a diagram illustrating an embodiment of a system for wafer distortion measurement.

FIG. 2 is a diagram illustrating an embodiment of a system for wafer distortion measurement. In the example shown, illumination source 200 is disposed to generate a beam of light that reflects off splitter 202 toward optic 204. In some embodiments, optic 204 comprises a lens with a focal length 1000 mm. Optic 204 collimates the beam of light that is then reflected by minor 206 toward reference transmission grating 208 that transmits and diffracts the incident light beam into a plurality of diffraction orders. The plurality of diffraction orders interrogates target diffraction grating 210. Target diffraction grating 210 and reference transmission grating 208 are parallel. The plurality of diffraction orders are diffracted and/or reflected from target grating 210 and are split again into a second plurality of diffraction orders by being transmitted and/or diffracted through reference transmission grating 208. The second plurality of diffraction orders are reflected back from minor 206 and focused using optic 204 and filtered using pupil 212 (after being transmitted through splitter 202). Pupil 212 allows transmission of a subset of the second plurality of diffraction orders (the plurality of diffraction orders of light that have been diffracted and/or reflected from the target grating after being split again by passing through the reference transmission grating). The subset of the second plurality of diffraction orders is transmitted by optic 214 and measured using detector 216. In some embodiments, optic 214 comprises a lens with focal length 50 mm. In some embodiments, detector 216 has aperture of 15 mm. In some embodiments, WG or the Wafer Grating (also referred to as target grating 210) has a diameter of 300 mm.

As shown in FIG. 2, two parallel gratings (reference transmission grating 208 and target grating 210) are placed facing each other, where the test wafer (target grating 210) and the transparent substrate (reference transmission grating 208) have a reflection grating and a transmission grating on them, respectively. Here, AG or the Analyzer Grating (also referred to as reference transmission grating 208) comprises a transmission grating serving as the reference for the distortion measurement. And, WG or the Wafer Grating (also referred to as target grating 210) comprises a test wafer that has a grating formed on its surface. The WG may be formed on the entire surface of the test wafer or may be formed a part of the surface of the test wafer. The WG can also be used as an alignment mark on the wafer or may be arranged adjacent to the alignment mark on the wafer. In various embodiments, the AG comprises a 1D grating, the WG comprises a 1D grating, or the AG and the WG comprise a 1D grating. In various embodiments, the AG comprises a 2D grating, the WG comprises a 2D grating, or the AG and the WG comprise a 2D grating. 2D gratings having a two-dimensional grid that enables measurement of distortion in two directions (e.g., an x-direction and y-direction in the plane of the WG).

In some embodiments, the period of the AG and the period of the WG are related in that the period of the AG is substantially equivalent to twice the period of the WG. For example, the period of AG (Pa) is such that Pa=1 um and the period of WG (Pw) is such that Pw=0.5 um. This condition is referred to as period relation Type A herein. Other grating period relations are also possible and will be also be discussed.

In some embodiments, the system for measuring wafer distortion measures by measuring a target grating (e.g., a grating placed or etched into a wafer). The system comprises illumination source 200, reference transmission grating 208, pupil filter 212, detector 216, analyzer 220, actuator 222, and actuator 218. Illumination source 200 is disposed to generate an incident light beam that illuminates reference transmission grating 208. The wavelength (frequency) of the light beam from illumination source 200 may be fixed or may change. Reference transmission grating 208 splits the incident light beam into a plurality of diffraction orders. The plurality of diffraction orders interrogates target grating 210. Reference transmission grating 208 and target grating 210 are parallel. Pupil filter 212 allows transmission of a subset of diffraction orders of light that has been diffracted and/or reflected from target grating 210 after being split again by passing through reference transmission grating 208. Detector 216 takes a measurement of the subset of diffraction orders of light after transmission through the pupil filter.

In some embodiments, analyzer 220 determines a distortion map of target grating 210 using a measurement of a subset of diffraction orders of light. For example, detector 216 detects diffraction orders that are generated by incident illumination diffracted or transmitted by reference transmission grating 208 and diffracted or reflected by target grating 210 and filtered by pupil filter 212.

In some embodiments, actuator 218 causes a displacement of reference transmission grating 208 in a plane of reference transmission grating 208 and perpendicular to lines of reference transmission grating 208. In some embodiments, the displacement produces one of a set of known phase shifts.

In some embodiments, actuator 222 causes a displacement of target grating 210 in a plane of target grating 210 and perpendicular to lines of target grating 210. In some embodiments, the displacement produces one of a set of known phase shifts.

In some embodiments, the subset of diffraction orders of light comprises a first order diffracted light from reference transmission grating 208 diffracted back to normal incidence by target grating 210 mixed with a transmitted light through reference transmission grating 208 that is first order reflection diffracted from target grating 210 and then diffracted back to normal transmission through reference transmission grating 208.

In some embodiments, the incident light beam transmits off normal incidence through reference transmission grating 208 and diffracts (e.g., by target grating 210) back to normal to reference transmission grating 208 mixed with the incident light beam diffracted by reference transmission grating 208 and first order reflection diffracted (e.g., by target grating 210) to normal to reference transmission grating 208.

In some embodiments, the normal incident light beam transmits through reference transmission grating 208 and reflection diffracts from target grating 210 to an off incidence angle and transmits through reference transmission grating 208 mixed with light reflection diffracted by target grating 210 and then transmission diffracted by reference transmission grating 208 to the off incidence angle.

In various embodiments, reference transmission grating 208 comprises a one-dimensional grating or a two-dimensional grating.

In various embodiments, target grating 210 comprises a one-dimensional grating or a two-dimensional grating.

In various embodiments, actuator 218 causes a rotation displacement of reference transmission grating 208 relative to target grating 210 about an axis perpendicular to a plane of reference transmission grating 208 and/or perpendicular to a second plane perpendicular to target grating 210.

In some embodiments, pupil filter 212 includes pupils to allow only a first specific diffraction combination in an x-axis direction.

In some embodiments, pupil filter 212 includes pupils to allow only a second specific diffraction combination in a y-axis direction.

In some embodiments, a one-dimensional period of reference transmission grating 208 is substantially equivalent to two times a one-dimensional period of target grating 210. In some embodiments, illumination source 200 is broadband so that the illumination source has low temporal coherence. In some embodiments, illumination source 200 has a wavelength such that target grating 210 has a one-dimensional grating period greater than half of the wavelength and less than the wavelength.

In some embodiments, a one-dimensional period of reference transmission grating 208 is substantially equivalent to a one-dimensional period of target grating 210 (e.g., within 1%, 2%, 5%, 10%, etc. of the one-dimensional period). In some embodiments, illumination source 200 is broadband so that the illumination source has low temporal coherence. In some embodiments, illumination source 200 has a wavelength such that target grating 210 has a one-dimensional grating period greater than the wavelength and less than two times the wavelength.

In some embodiments, a one-dimensional period of reference transmission grating 208 is substantially equivalent to half a one-dimensional period of target grating 210 (e.g., within 1%, 2%, 5%, 10%, etc. of half the one-dimensional period). In some embodiments, illumination source 200 is narrowband so that the illumination source has high temporal coherence. In some embodiments, illumination source 200 has a wavelength such that target grating 210 has a one-dimensional grating period greater than the wavelength and less than two times the wavelength.

In some embodiments, one-dimensional period of reference transmission grating 208 is substantially equivalent to half a one-dimensional period of target grating 210 (e.g., within 1%, 2%, 5%, 10%, etc. of half the one-dimensional period). In some embodiments, illumination source 200 is broadband so that illumination source 200 has low temporal coherence, and wherein illumination source 200 has a delayed optical path and a non-delayed optical path. In some embodiments, illumination source 200 has a wavelength such that target grating 210 has a one-dimensional grating period greater than the wavelength and less than two times the wavelength.

Figure 3:
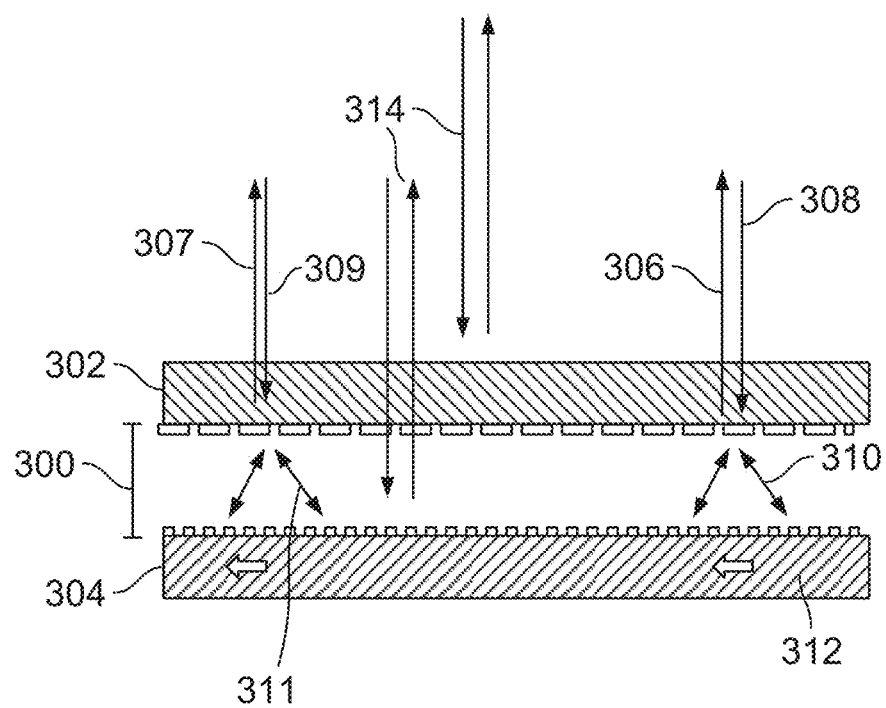
FIG. 3 is a diagram illustrating an embodiment of an analyzer grating and a wafer grating.

FIG. 3 is a diagram illustrating an embodiment of an analyzer grating and a wafer grating. In some embodiments, the analyzer grating (AG) and the wafer grating (WG) of FIG. 3 comprise reference transmission grating 208 and target grating 210, respectively, of FIG. 2. In the example shown, incident light 308 or 309 is diffracted by reference transmission grating 302 and diffracted back by target grating 304 along path 306 or 307, respectively. The ±1 diffraction orders (diffraction orders 310 or 311) off the AG (reference transmission grating 302) are diffracted by the WG (target grating 304), and the beams merge back at the AG to be guided to a detector (e.g., detector 216 of FIG. 2). The lenses of the system (e.g., optic 204 and optic 214 of FIG. 2) make the detector and the wafer surface of WG conjugate. Diffracted beams from the AG form multiple interference fringes on the AG plane. The lenses of the system (e.g., optic 204 and optic 214 of FIG. 2) form an image of the multiple interference fringes on the detector plane. In some embodiments, the period of the AG and the period of the WG are related in that the period of the AG is substantially equivalent to twice the period of the WG. For example, the period of AG (Pa) is such that Pa=1 um and the period of WG (Pw) is such that Pw=0.5 um. When the wafer shifts by δx (e.g., along direction 312), it causes a phase change of δφ, where $$\delta\varphi = 4\pi \times \delta x / Pw. \tag{1}$$

For example, if Pw=500 nm and δx=1 nm, δφ=π/125 (rad). When the wafer contracts or expands locally by 1 nm, the local phase changes by this amount. By measuring the phase map of the wafer surface, local expansions/contractions of the wafer can be determined.

In some embodiments, the AG and the WG are placed to within less than 1 mm of each other, and air fluctuations do not significantly influence the system and its measurement. Since distortions are determined based on the position information from two points on the WG, the spatial resolution depends on the distance between the gratings (the AG and WG). If the grating separation distance (e.g., separation distance 300) is about 0.5 mm, the measurement resolution is about 0.5 mm, which enables a much denser measurement than the conventional laser-based measurement. Setting a grating separation distance to approximately 0.5 mm is easily accomplished using practical system components.

In the example shown in FIG. 3, light other than the intended signal, including the reflected 0 order light (e.g., light 314) from both the AG (reference transmission grating 302) and WG (target grating 304), have significant intensity, making the fringe contrast (e.g., signal to noise ratio (SNR)) very poor at the detector. In some embodiments, the method described in FIGS. 4A, 4B, and 4C are able to increase the SNR.

Figure 4A:
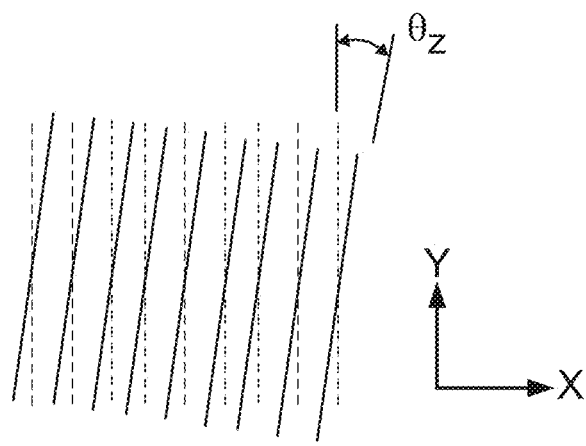
FIGS. 4A, 4B, and 4C are diagrams illustrating embodiments of grating orientation relations and pupil filter plane intensity.
Figure 4B:
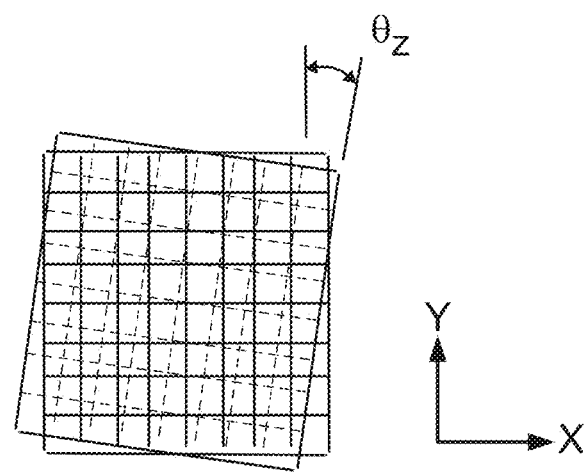
Figure 4C:
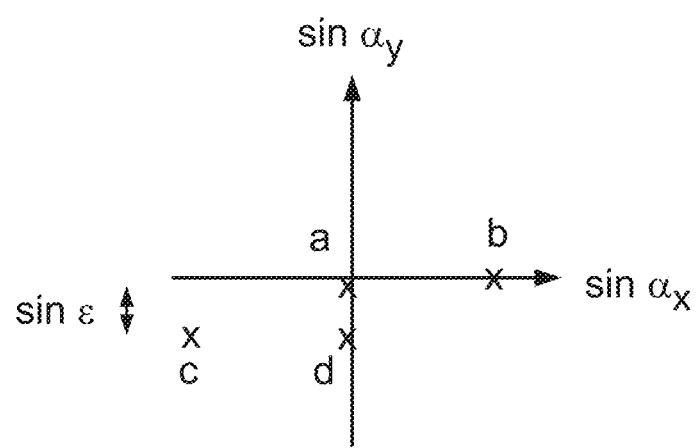

FIGS. 4A, 4B, and 4C are diagrams illustrating embodiments of grating orientation relations and pupil filter plane intensity. In some embodiments, the grating comprises an AG (e.g., reference transmission grating 302 of FIG. 3) and/or a WG (e.g., target grating 304 of FIG. 3). In the example shown in FIG. 4A, an X distortion measurement is considered with a grating having a periodicity in the x dimension. If the WG is rotated by $\theta z$ relative to the AG as shown in FIG. 4A (either WG or AG is rotated and angle $\theta z$), the ±1 diffraction orders coming back from the WG and AG will be separated by angles ±ε, as shown in FIG. 4C. The angle $$\varepsilon = 2\lambda/Pa \times \theta z = \lambda/Pw \times \theta z, \quad (2)$$

where the period of AG is Pa, the period of WG is Pw, $\theta z$ is the relative rotation angle between AG and WG, and $\lambda$ is the wavelength of the incident light.

In the example shown in FIG. 4B, an X-Y distortion measurement is considered with a grating having a periodicity in the x and y dimensions where the rotation of $\theta z$ is introduced between the AG and the WG.

In the example shown in FIG. 4C, the change of the diffracted orders from the 1D-1D AG/WG case. Point a is the directional sine of the incident beam; Point b is the directional sine after diffraction by the AG; Point c is the directional sine after diffraction by the WG, where there is a y-component due to the rotation of WG; and, point d is the directional sine after diffraction by AG, where the backward diffracted beam (point d) is shifted in the y-direction from the incident beam.

Figure 5:
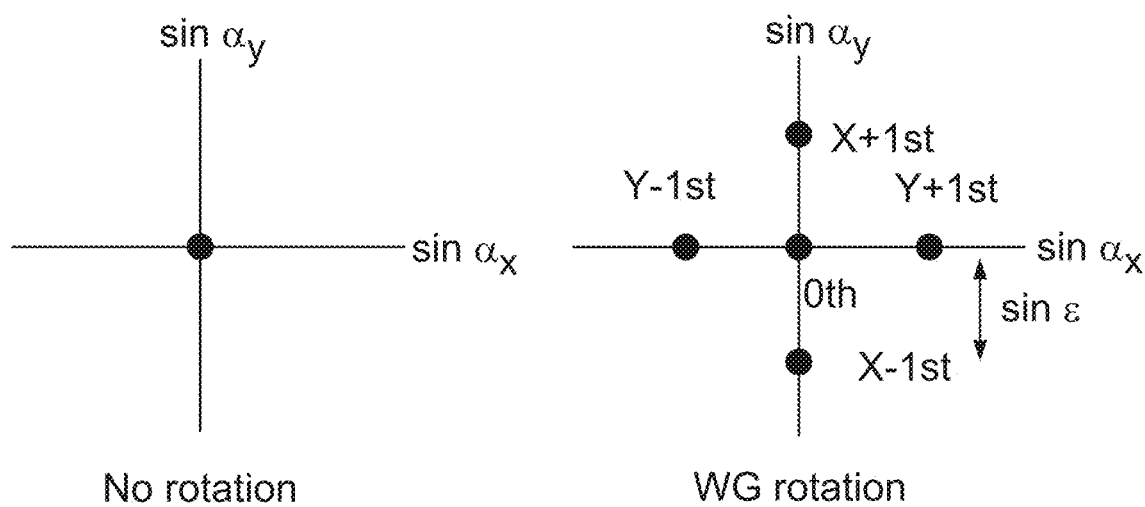
FIG. 5 is a diagram illustrating embodiments of pupil plane intensities.

FIG. 5 is a diagram illustrating embodiments of pupil plane intensities. In some embodiments, the pupil plane intensities are associated with pupil 212 of FIG. 2. In some embodiments, the point d of FIG. 4 corresponds to X–$1^{st}$ of FIG. 5. In the example shown, the graph on the left in FIG. 5 shows 0 and 1 orders overlapped at the origin before the WG is rotated. The graph on the right in FIG. 5 shows 1 and 0 orders separated from the origin by sin ε when the WG is rotated. With 1D gratings, only X±1 orders exist (e.g., X+$1^{st}$ and X–$1^{st}$). With 2D gratings, which diffract light in two directions, four diffraction orders exist: X±1 orders (e.g., X+$1^{st}$ and X–$1^{st}$) and Y±1 orders (e.g., Y+$1^{st}$ and Y–$1^{st}$).

Figure 6:
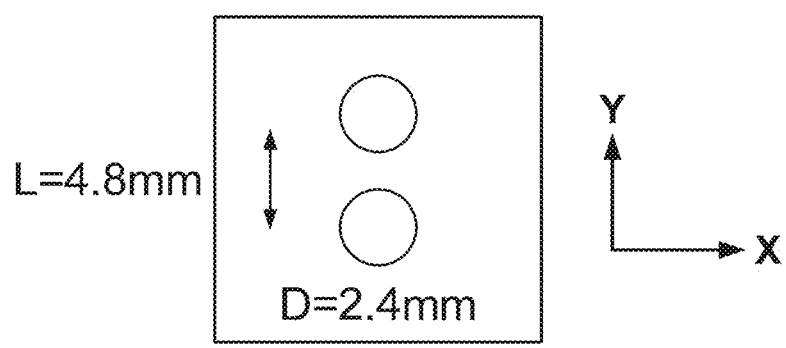
FIG. 6 is a diagram illustrating embodiments of a pupil filter.

FIG. 6 is a diagram illustrating embodiments of a pupil filter. In some embodiments, the pupil filter of FIG. 6 is used to implement pupil 212 of FIG. 2. In the example shown, depending on separation angle ε, a pupil filter can be determined and disposed to allow a subset of the diffraction orders (e.g., X±1 orders or X+$1^{st}$ and X–$1^{st}$ of FIG. 5). The pupil filter, as shown in FIG. 6, can be placed at the lens focal plane (e.g., at the back focal plane of optic 204 of FIG. 2) includes two apertures (e.g., two circular 2.4 mm diameter apertures separated 4.8 mm apart in the Y direction) to allow the desired orders through and to block all other orders.

In this case, the X±1 orders are separated in Y direction and form horizontal fringes on the sensor. A Fourier transform or a phase shift method can be applied to the fringes to reconstruct a phase map of the wafer, which in turn provides the measured in-plane distortions. The Fourier transform method enables distortion measurement with fixed gratings. The phase shift method reconstructs phase based on changes in bright and dark regions of the horizontal fringes as the fringes change in intensity when a grating is moved laterally in the X direction.

Figure 7:
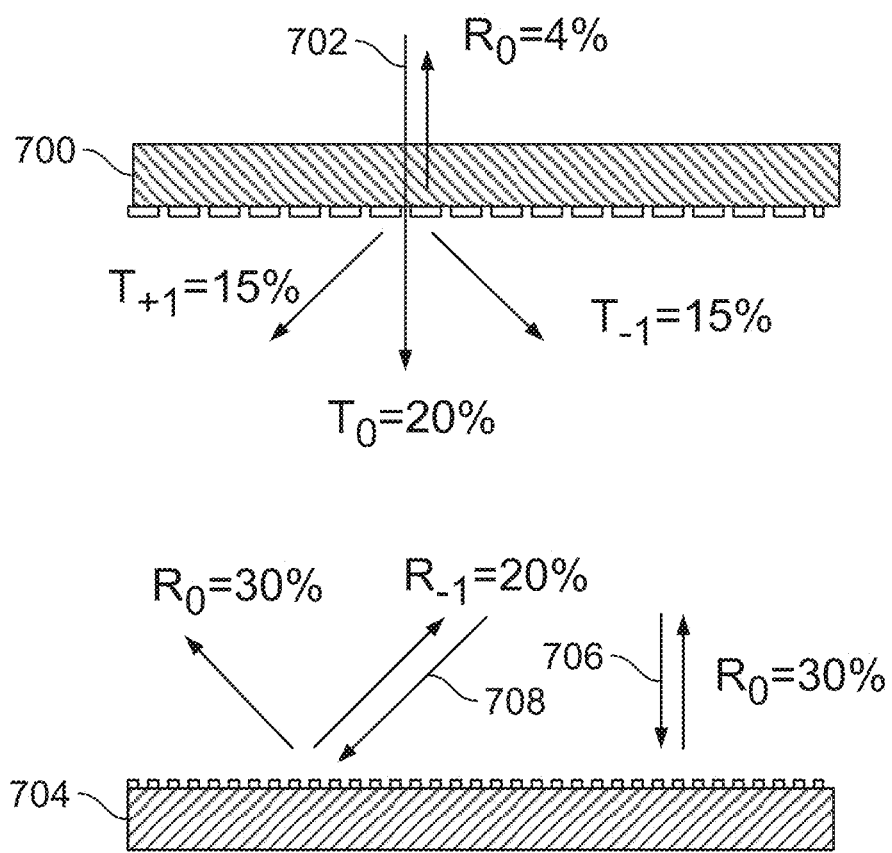
FIG. 7 is a diagram illustrating embodiments of diffraction efficiencies.

FIG. 7 is a diagram illustrating embodiments of diffraction efficiencies. In some embodiments, reference transmission grating 700 comprises the AG or transmission grating 208 of FIG. 2. In some embodiments, target grating 704 comprises the WG or target grating 210 of FIG. 2. In the example shown, incident light 702 to reference transmission grating 700 is transmitted with transmission efficiency $T_0$, reflected with efficiency $R_0$, and diffracted with efficiencies $T_{+1}$ and $T_{-1}$. In this case, $T_0$ is 20%, $R_0$ is 4%, $T_{+1}$ and $T_{-1}$ are 15%. Incident light 706 normal to target grating 704 is reflected with reflection efficiency $R_0$, and off angle incident light 708 is diffracted with efficiencies $R'_0$ and $R_{-1}$. In this case, $R_0$ is 30%, $R'_0$ is 30% and $R_{-1}$ is 15%.

Figure 8:
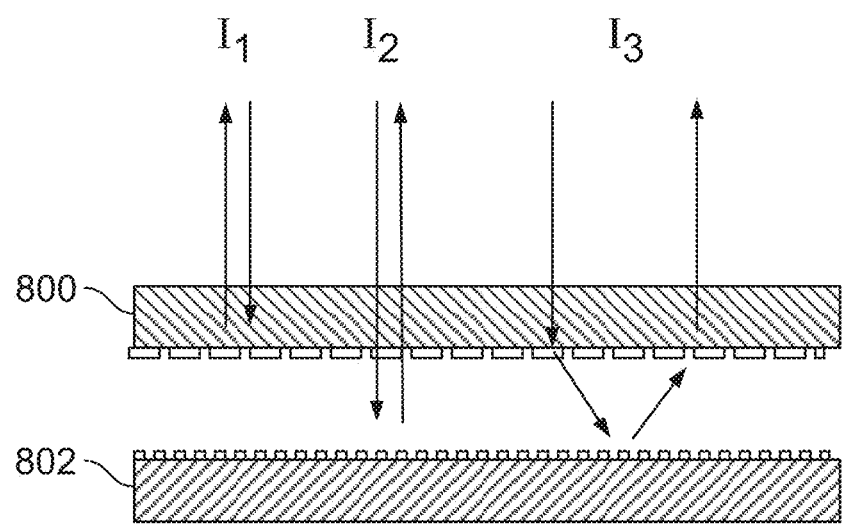
FIG. 8 is a diagram illustrating an embodiment of intensity contributions
Figure 9E:
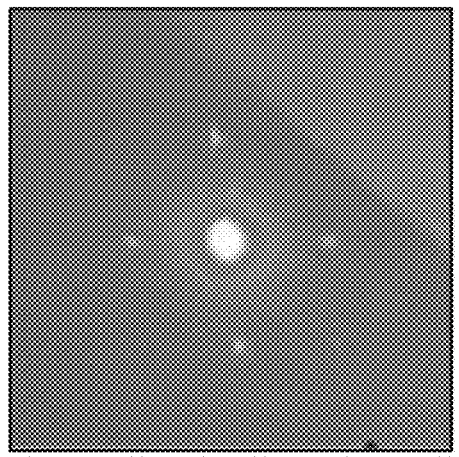
Figure 9F:
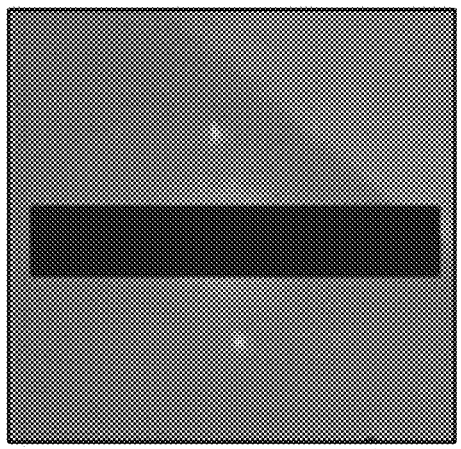
Figure 9G:
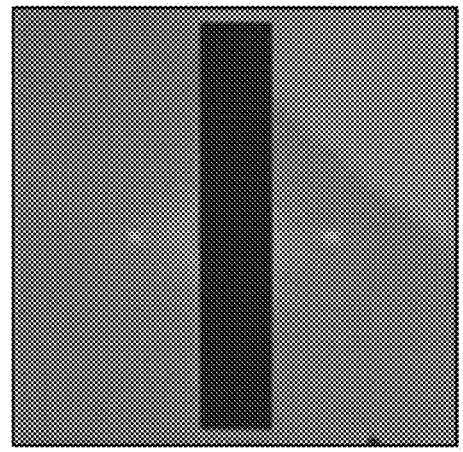

FIG. 8 is a diagram illustrating an embodiment of intensity contributions. In some embodiments, reference transmission grating 800 comprises the AG or transmission grating 208 of FIG. 2. In some embodiments, target grating 802 comprises the WG or target grating 210 of FIG. 2. In the example shown, contributions to back-reflected light at normal incidence comprise $I_1$, $I_2$, and $I_3$. $I_1$ comprises light back reflected from reference transmission grating 800. $I_2$ comprises light transmitted through reference transmission grating 800, back reflected from target grating 802, and transmitted again through reference transmission grating 800. $I_3$ comprises light diffracted by reference transmission grating 800, reflected from target grating 802, and diffracted by reference transmission grating 800 back to normal incidence.

An example pupil filter design and its effects are described as follows. The optical system is assumed to be as shown in FIG. 2. The AG and WG are 2D gratings (e.g., the AG comprises reference transmission grating 800 and WG comprises target grating 802) with diffraction efficiencies as shown in FIG. 8. The system has the characteristics:

$Pa=1$ um, $Pw=0.5$ um, and $\kappa=0.6$ um.

$AG: T_1=15\%, T_0=20\%,$ and $R_0=5\%$ $WG: R_{-1}=20\%$ and $R_0=30\%$ \quad (3)

If WG rotation angle $\theta z=2$ mrad, $\varepsilon=2.4$ mrad. At the focal plane of an $f_1=1000$ mm lens, the ±1 orders will be separated by ±2.4 mm. Therefore, a pupil filter as shown in FIG. 6 can block out unwanted light except ±1 orders. Denoting the aperture diameter of the pupil filter as D, and the center distance between the two apertures L, $L=2f_1\varepsilon$ and $D=f_1\varepsilon$.

In the present case, $f_1$=1000 mm and $\varepsilon$=2.4 mrad; therefore, $$L=4.8 \text{ mm and } D=2.4 \text{ mm}. \quad (4)$$

The intensity of the respective intended signal, the ±1 diffraction orders, is $$I_s=15\%*20\%*15\%=0.45\%. \quad (5)$$

The three strongest unwanted intensities are as follows:

$$I_1=4\%,$$

$$I_2=20\%*30\%*20\%=1.2\%,$$

$$I_3=15\%*30\%*15\%=0.675\%. \quad (6)$$

The total intensity of the third type of unwanted diffraction is 2.7% because, with a 2D grating, light is diffracted in four directions and the orders overlap. The total unwanted intensity is an order of magnitude more intense than the intended signal. In this case, the signal contrast is $$\gamma=2I_s/(2I_s+I_1+I_2+4I_3)=10.3\%. \quad (7)$$

If a pupil filter is used, the light from unwanted diffraction orders (e.g., the light from all but the ±1 orders) can be blocked, and the signal contrast can potentially be increased to 100%. Since generally, the repeatability of the measurement is proportional to signal contrast, the isolation and selection of the intended signal improves repeatability by almost an order of magnitude.

FIGS. 9A, 9B, 9C, 9D, 9E, 9F, and 9G illustrate embodiments of combinations of different types of gratings and pupil filters. In some embodiments, the gratings comprise examples of reference transmission grating 208 and/or target grating 210 of FIG. 2. In some embodiments, pupil filters comprise examples of pupil filter 212 of FIG. 2. In the example shown in FIG. 9A, a 2D grating produces four ±1 diffraction orders. First, a pupil filter X is used to isolate diffraction orders to measure X distortions. Then, the filter is switched to a pupil filter Y to measure Y distortions. In this case, the signal has a 100% contrast.

In the example shown in FIG. 9B, four apertures are used to isolate the four diffraction orders. In this case, the pupil filter does not need to be changed or switched; however, the fringe contrast will not be 100%, so the measurement is less repeatable.

In the example shown in FIG. 9C, alternating 1D gratings are formed on either the AG or WG. For example, each 1 mm square region may have a grating in X or Y direction. This type of grating provides better repeatability, because generally, 1D gratings are more efficient than 2D gratings. While 1D gratings cannot measure the distortions of a given location in two directions, they are more than adequate if the distortions change slowly. The pupil filters can be switched as shown in FIG. 9A or in FIG. 9B.

In the example shown in 9D, the spatial resolution of the measurement of WG is determined by the aperture diameter of the pupil filters; however, a pupil filter such as the one in FIG. 9D can accommodate various grating rotation angles.

In the example shown in 9E, the image of intensity in the pupil filter plane is displayed. In the example shown in 9F, the intensities along the X axis are blocked in the pupil filter plane. In this example, in the pupil plane there is a blocking rectangle that blocks the central order light as well as the diffraction orders along the X axis, but allowing the diffraction orders along the Y axis. In the example shown in 9G, the intensities along the Y axis are blocked in the pupil filter plane. In this example, in the pupil plane there is a blocking rectangle that blocks the central order light as well as the diffraction orders along the Y axis, but allowing the diffraction orders along the X axis.

Figure 10A:
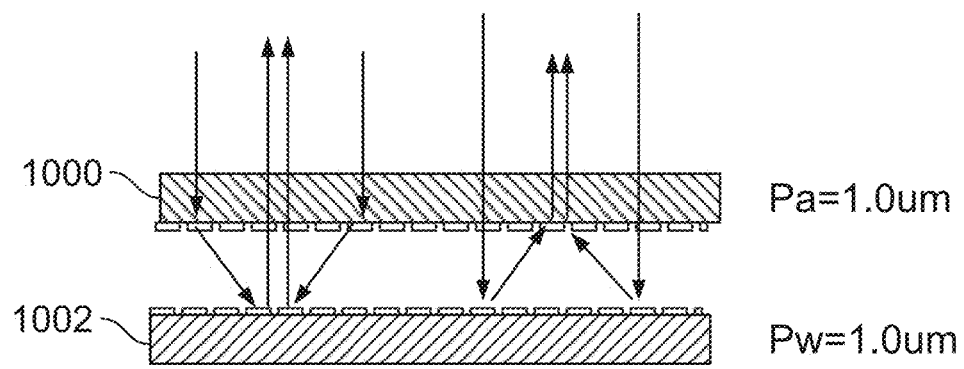
FIG. 10A is a diagram illustrating embodiments of a reference transmission grating and a target grating.

FIG. 10A is a diagram illustrating embodiments of a reference transmission grating and a target grating. In some embodiments, reference transmission grating 1000 comprises the AG or transmission grating 208 of FIG. 2. In some embodiments, target grating 1002 comprises the WG or target grating 210 of FIG. 2. In the example shown, grating period of reference transmission grating 1000 is substantially equivalent to grating period of target grating 1002 (e.g., Pa=Pw—for example, Pa=1.0 um and Pw=1.0 um). In some embodiments, this is referred to as Type B. In this combination, the light diffracted by the AG in the first pass and the light diffracted by the AG in the second pass overlap. In this case, too, the intended signal can be isolated from the unwanted lights by rotating either the AG or WG.

Figure 10B:
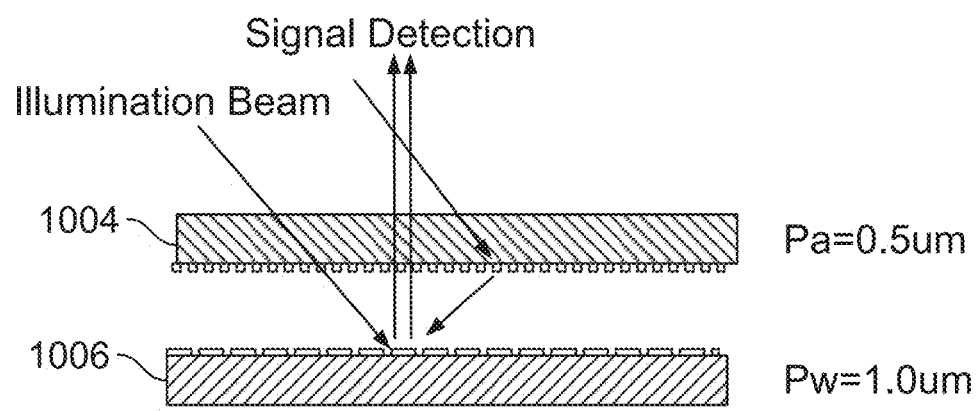
FIG. 10B is a diagram illustrating embodiments of a reference transmission grating and a target grating.

FIG. 10B is a diagram illustrating embodiments of a reference transmission grating and a target grating. In some embodiments, reference transmission grating 1004 comprises the AG or transmission grating 208 of FIG. 2. In some embodiments, target grating 1006 comprises the WG or target grating 210 of FIG. 2. In the example shown, grating period of reference transmission grating 1004 is substantially equivalent to half the grating period of target grating 1006 (e.g., Pa=Pw/2—for example, Pa=0.5 um and Pw=1.0 um). In some embodiments, this is referred to as Type C. In this case, the light is incident at an angle, and the signal coming out in the direction orthogonal to the grating is detected. This approach has better spatial resolution than Type A or Type B because it measures a single point on the WG; however, the oblique incidence makes the apparatus larger and more complex.

Figure 10C:
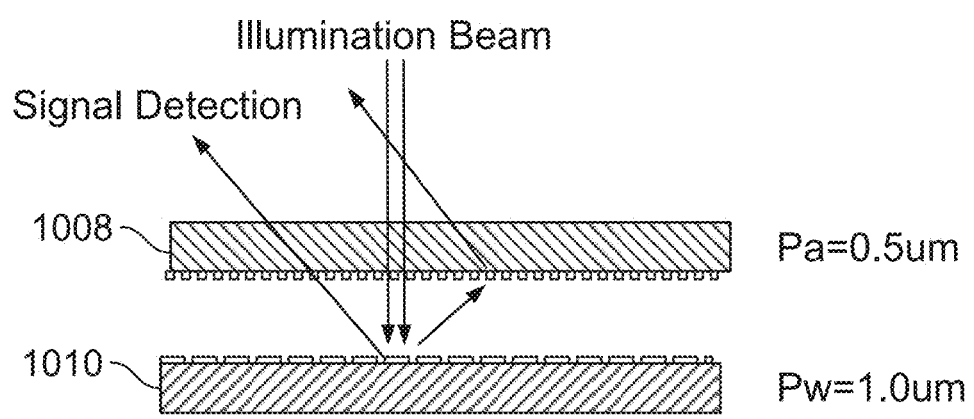
FIG. 10C is a diagram illustrating embodiments of a reference transmission grating and a target grating.

FIG. 10C is a diagram illustrating embodiments of a reference transmission grating and a target grating. In some embodiments, reference transmission grating 1008 comprises the AG or transmission grating 208 of FIG. 2. In some embodiments, target grating 1010 comprises the WG or target grating 210 of FIG. 2. In the example shown, grating period of reference transmission grating 1008 is substantially equivalent to half the grating period of target grating 1010 (e.g., Pa=Pw/2—for example, Pa=0.5 um and Pw=1.0 um). In some embodiments, this is referred to as Type C. In this case, the light is incident normal to the surface, and the signal coming out at an angle to the grating is detected. This approach has better spatial resolution than Type A or Type B because it measures a single point on the WG; however, the oblique detection makes the apparatus larger.

In Type C, since the specularly-reflected light does not overlap with the signal, the signal has high contrast even if the 0 order is not blocked. The phase is reconstructed by phase shifting that is achieved by moving the test grating. The phase can be reconstructed based on a Fourier transform method without moving the WG. When either the AG or WG is rotated, ±1 diffraction orders come out at an angle, making multiple interference fringes on the sensor, which are then analyzed using a Fourier transform to determine a measurement of the target grating.

In all Types A, B, and C, the amount of phase change due to a displacement of a wafer grating is proportional to the grating displacement/grating period, so the smaller the grating period, the higher the measurement accuracy. Therefore, the measurement accuracy of Type A is twice as good as that of Type B or C due to its smaller wafer grating period.

In some embodiments, Type A uses the first-order Littrow diffraction; the relation between Pw and Pa and the illuminating light wavelength is such that Pw is $\lambda/2<Pw<\lambda$ so that only the first-order diffraction light is generated and no second order (or other high orders) are generated. Although Pw>λ also works, it will cause second- and higher-diffraction orders which weaken the relative intensity of the first-order diffractions. This is less favorable for measurement repeatability.

In some embodiments, for Types B and C, the relation between Pw and Pa and the illuminating light wavelength is such that λ<Pw<2λ is preferred so that no second diffraction orders occur with respect to the normally incident light.

For the wafer distortion measurement system, since the two diffraction gratings are parallel, the optical path difference of the separated ±1 diffraction orders is almost zero; therefore, the light source does not need to be monochromatic to produce a signal. In fact, a broadband Super Luminescent Diode (SLD) or a Light Emitting Diode LED light source is preferred over a laser so as to reduce the influence of scattered and stray reflection light coming from a lens or a particle on a grating. These light sources have a bandwidth $\Delta\lambda$=10-20 nm, approximately, so the coherence length $Lc=\lambda^2/\Delta\lambda$=several 10 um. Therefore, scattered light from a dust particle will not interfere if it is separated by 100 um or more in optical path length, causing no negative impact on measurement repeatability. Using a broadband light source, stray reflections off optical components of the system will not deteriorates the signal because the coherence length is short.

Figure 11A:
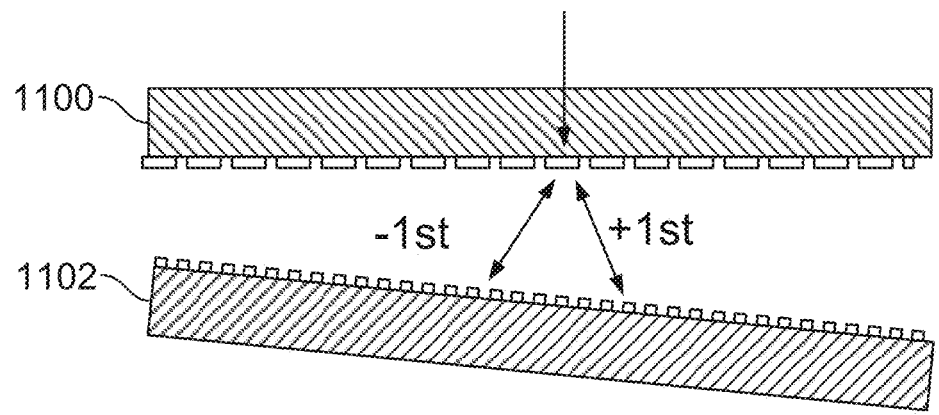
FIG. 11A is a diagram illustrating embodiments of a reference transmission grating and a target grating.

FIG. 11A is a diagram illustrating embodiments of a reference transmission grating and a target grating. In some embodiments, reference transmission grating 1100 comprises the AG or transmission grating 208 of FIG. 2. In some embodiments, target grating 1002 comprises the WG or target grating 210 of FIG. 2. In the example shown, In the case of using a broadband light source, the two diffraction gratings must have good parallelism. In Type A, when the parallelism of the two gratings is poor, the path lengths traveled by the +1 and -1 diffraction orders are no longer equal, leading to a reduction of signal contrast in the measurement. The same is also true for Type B measurements.

Figure 11B:
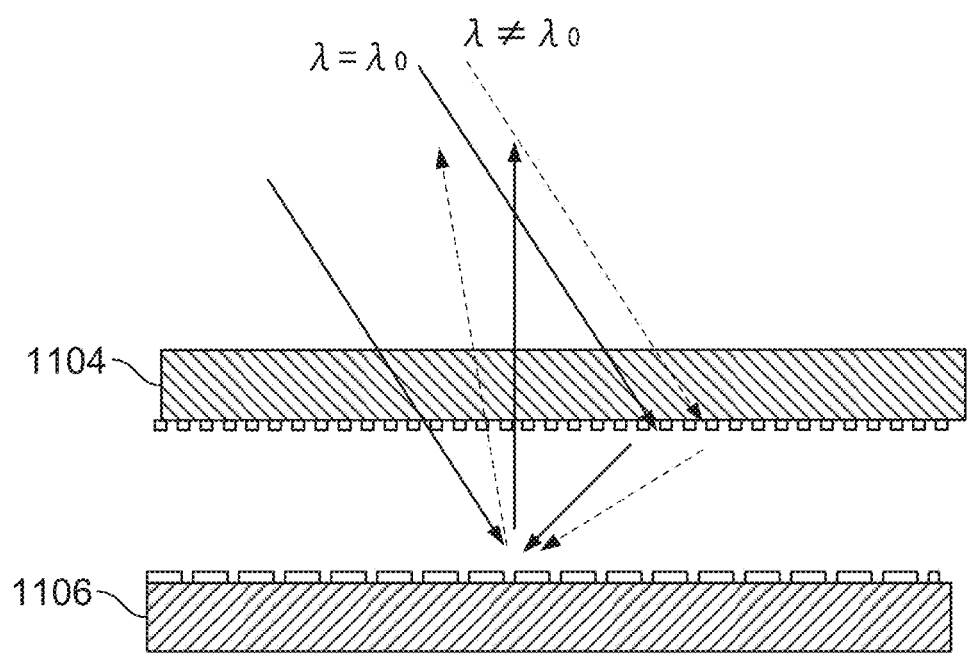
FIG. 11B is a diagram illustrating embodiments of a reference transmission grating and a target grating.

FIG. 11B is a diagram illustrating embodiments of a reference transmission grating and a target grating. In some embodiments, reference transmission grating 1100 comprises the AG or transmission grating 208 of FIG. 2. In some embodiments, target grating 1002 comprises the WG or target grating 210 of FIG. 2. In the example shown, Note that for Type C, if the two gratings are parallel, changes in the wavelength of the light source will cause optical path differences, resulting in the loss of signal. The solid lines indicate the optical paths for a designed wavelength, and the dashed lines for a wavelength longer than the intended design. The optical path of the designed wavelength returns straight up, whereas the ±1 orders of a wavelength deviating from the design will have unequal optical paths, resulting in a shift when overlapping. Consequently, the signal contrast decreases, or is completely lost in the worst case. Therefore, the illumination light source must have good monochromaticity.

Figure 12:
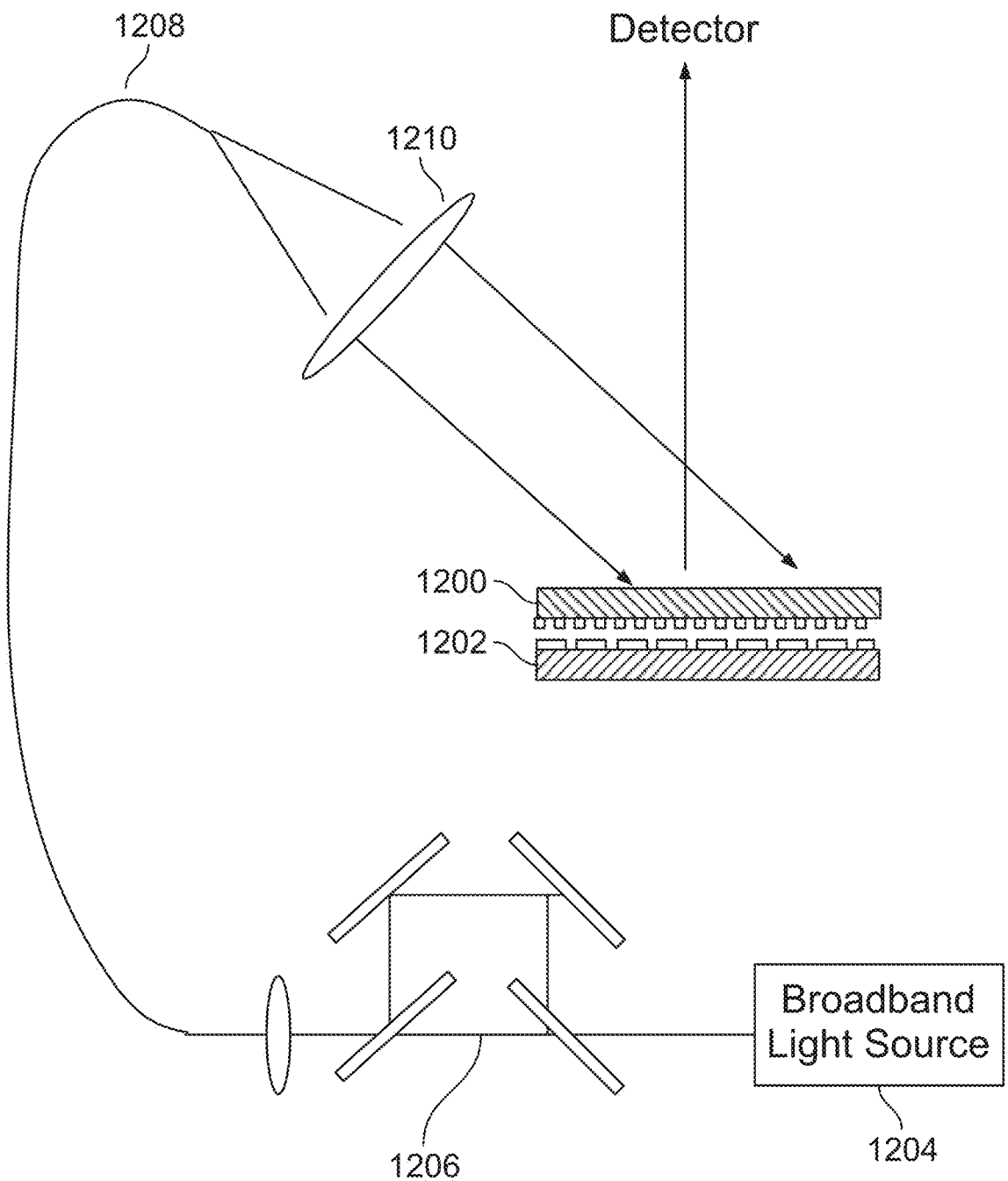
FIG. 12 is a diagram illustrating an embodiment of a system for wafer distortion measurement.

FIG. 12 is a diagram illustrating an embodiment of a system for wafer distortion measurement. In some embodiments, reference transmission grating 1200 comprises the AG or transmission grating 208 of FIG. 2. In some embodiments, target grating 1202 comprises the WG or target grating 210 of FIG. 2. In the example shown, light source 1204 is broadband and passed through optical delay 1206 to produce a delayed version of the light generated that propagates on the same path as the originally generated light. The light is transmitted through fiber 1208 and passed through optic 1210 to be incident at an angle to reference transmission grating 1200 and to target grating 1202. The light is then detected at normal incidence by a detector. Optical delay 1206 can be adjusted to maximize signal contrast by canceling out any phase differences caused by changes in the wavelength.

In some embodiments, since the disclosed method requires a grating to be formed on the wafer, it is presumed that this measurement is used for an off-line measurement with a test type wafer; however, it is possible to form a grating on some part of a wafer (i.e., the grating is not on the entire wafer) and to use those gratings to determine wafer distortion.

Note that this method measures the displacement of a WG relative to an AG; therefore, the AG must somehow be kept from expanding or contracting during the measurement. One option is to implement temperature controls to prevent thermal expansion. In various embodiments, the AG is temperature controlled, the WG is temperature controlled, the AG and the WG are temperature controlled, or the AG and the WG are not temperature controlled. Alternatively, a low thermal expansion material with high transmittance such as the CLEARCERAM® can be used to make the AG.

In various embodiments, the space between the WG and AG is filled with a gas (e.g., air, $N_2$, He, etc.) or vacuum.

In some embodiments, the method is used to measure the medium in the space between the WG and AG. For example, it can be used to measure changes in the refractive index of a fluid very accurately, by supplying the fluid between the two gratings and measuring phase changes, which would represent index of refraction variations.

In some embodiments, the test grating is made of a transparent material and transmission diffractions can be utilized. In this case, transmission diffractions are detected by placing the test transmission grating between two reference gratings.

Figure 13:
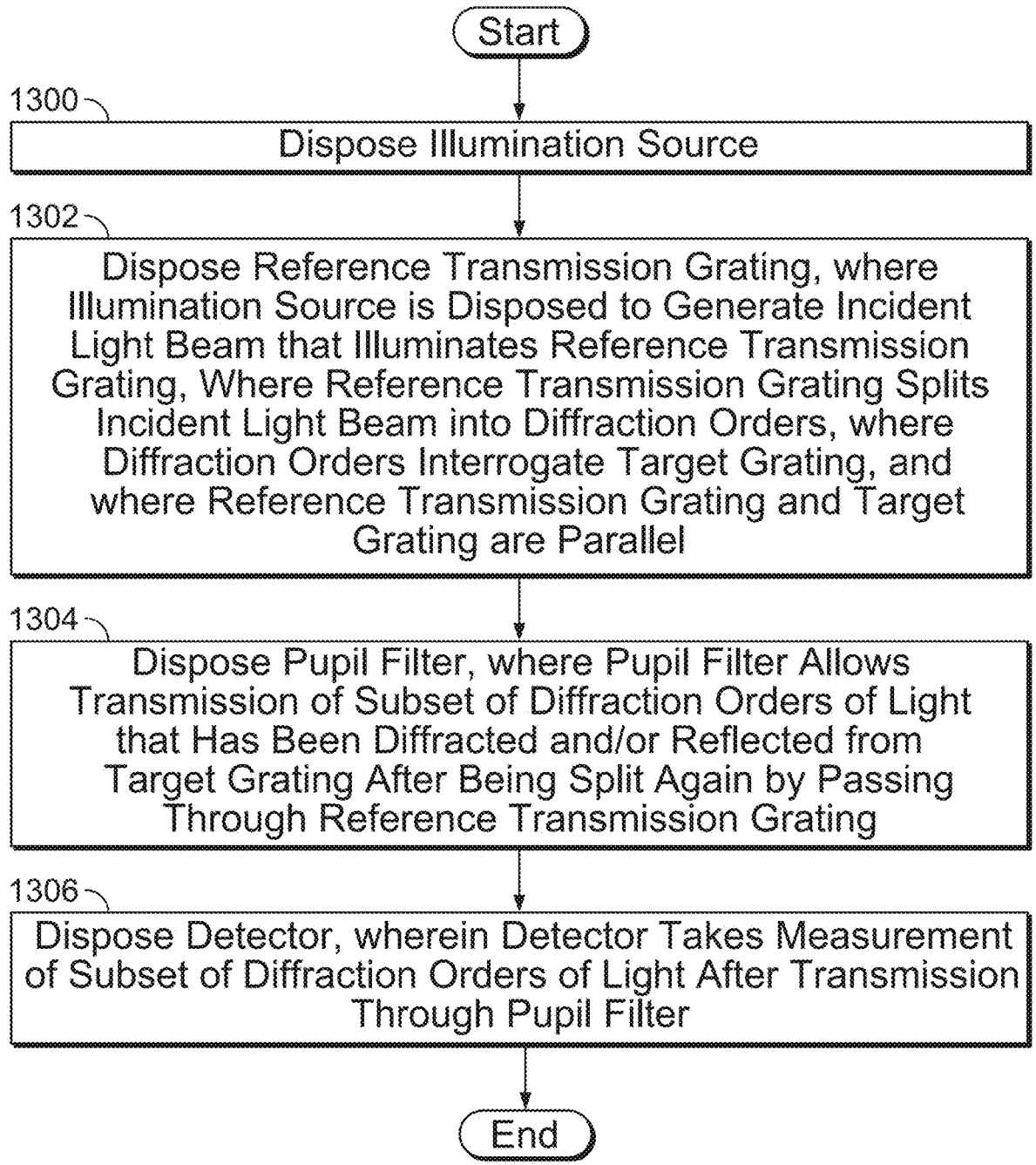
FIG. 13 is a flow diagram illustrating an embodiment of a process for a system for wafer distortion measurement.

FIG. 13 is a flow diagram illustrating an embodiment of a process for a system for wafer distortion measurement. In some embodiments, the process of FIG. 13 uses a system as in FIG. 2. In the example shown, in 1300 an illumination source is disposed. In 1302, a reference transmission grating is disposed and the illumination source is disposed to generate an incident light beam that illuminates the reference transmission grating. The reference transmission grating splits the incident light beam into a plurality of diffraction orders, the plurality of diffraction orders interrogates a target grating, and the reference transmission grating and the target grating are parallel. In 1304, a pupil filter is disposed, wherein the pupil filter allows transmission of a subset of diffraction orders of light that has been diffracted and/or reflected from the target grating after being split again by passing through the reference transmission grating. In 1306, a detector is disposed, wherein the detector takes a measurement of the subset of diffraction orders of light after transmission through the pupil filter.

Figure 14:
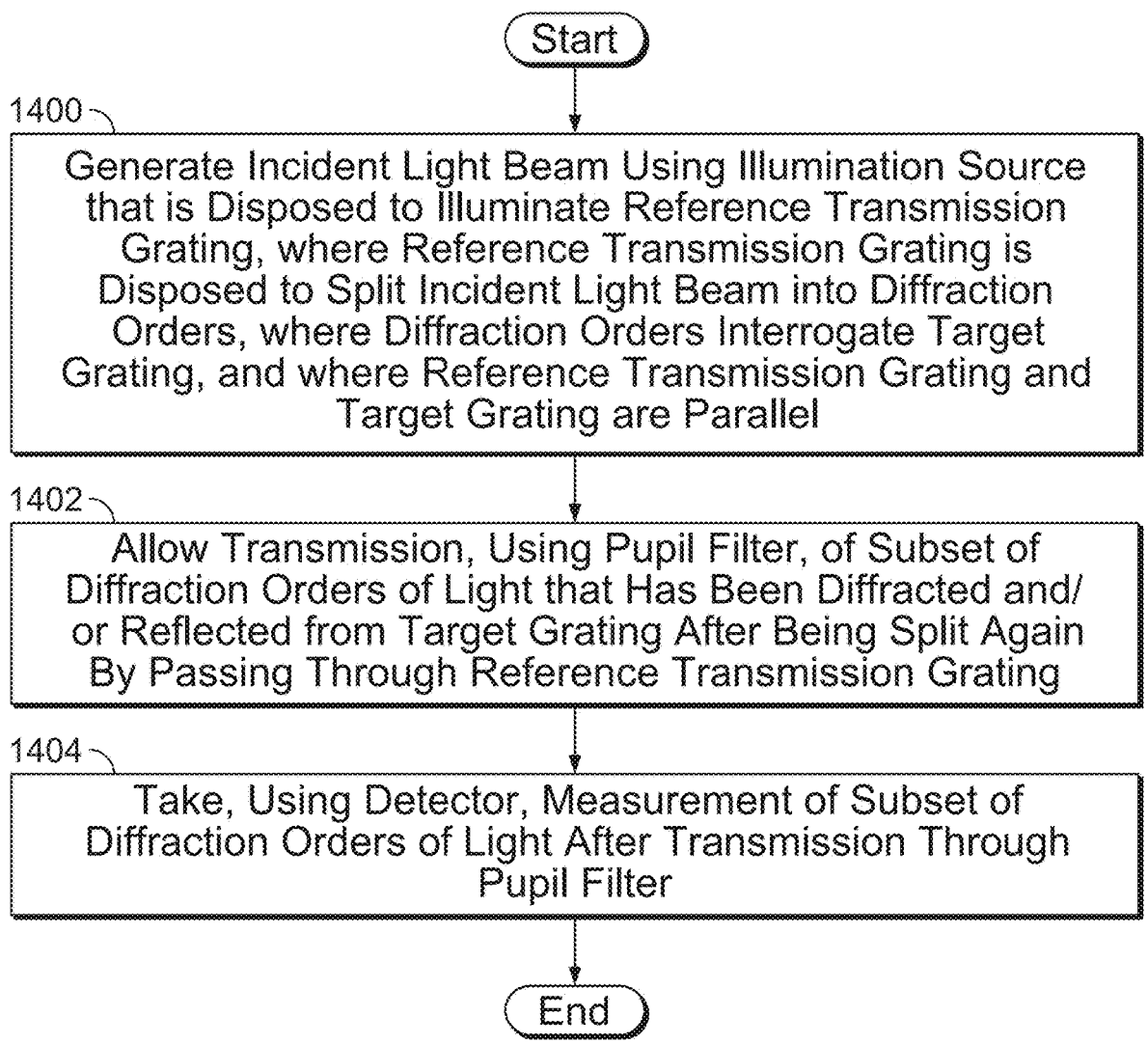
FIG. 14 is a flow diagram illustrating an embodiment of a process for a system for wafer distortion measurement.

FIG. 14 is a flow diagram illustrating an embodiment of a process for a system for wafer distortion measurement. In some embodiments, the process of FIG. 14 uses a system as in FIG. 2. In the example shown, In 1400 an incident light beam is generated using an illumination source that is disposed to illuminate the reference transmission grating. The reference transmission grating is disposed to split the incident light beam into a plurality of diffraction orders, the plurality of diffraction orders interrogates a target grating, and the reference transmission grating and the target grating are parallel. In 1404, transmission is allowed, using a pupil filter, of a subset of diffraction orders of light that has been diffracted and/or reflected from the target grating after being split again by passing through the reference transmission grating. In 1406, using a detector, a measurement is taken of the subset of diffraction orders of light after transmission through the pupil filter.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for measuring a target grating, comprising:
   an illumination source;
   a reference transmission grating, wherein the illumination source is disposed to generate an incident light beam that illuminates the reference transmission grating, and wherein the reference transmission grating splits the incident light beam into a plurality of diffraction orders;
   a target grating, wherein the plurality of diffraction orders interrogates the target grating, wherein the target grating generates a plurality of backward diffraction beams comprising a plurality of first backward diffraction beams and a plurality of second backward diffraction beams, and wherein the reference transmission grating and the target grating are parallel;
   a pupil filter member comprising a plurality of first pupil apertures aligned in a first direction and a plurality of second pupil apertures aligned in a second direction different from the first direction, wherein the plurality of diffraction orders from the target grating reach the pupil filter member via the reference transmission grating, wherein the plurality of first pupil apertures pass the plurality of first backward diffraction beams entering the pupil filter member, and wherein the plurality of second pupil apertures pass the plurality of second backward diffraction beams entering the pupil filter member; and
   a detector, wherein the detector takes a measurement of the plurality of first backward diffraction beams and the plurality of second backward diffraction beams.

2. The system of claim 1, further comprising an analyzer to determine a distortion map of the target grating using the measurement of the plurality of first backward diffraction beams and the plurality of second backward diffraction beams.

3. The system of claim 1, further comprising an actuator to cause a displacement of the reference transmission grating in a plane of the reference transmission grating perpendicular to lines of the reference transmission grating.

4. The system of claim 3, wherein the displacement produces one of a set of known phase shifts.

5. The system of claim 1, further comprising an actuator to cause a displacement of the target grating in a plane of the target grating perpendicular to lines of the target grating.

6. The system of claim 5, wherein the displacement produces one of a set of known phase shifts.

7. The system of claim 1, wherein the plurality of first backward diffraction beams and the plurality of second backward diffraction beams comprises a first order diffracted light from the reference transmission grating diffracted back to normal incidence by the target grating mixed with a transmitted light through the reference transmission grating that is first order reflection diffracted from the target grating and then diffracted back to normal transmission through the reference transmission grating.

8. The system of claim 1, wherein the incident light beam transmits off normal incidence through the reference transmission grating and diffracts backs to normal to the reference transmission grating mixed with the incident light beam diffracted by the reference transmission grating and first order reflection diffracted to normal to the reference transmission grating.

9. The system of claim 1, wherein the incident light beam transmits through the reference transmission grating and reflection diffracts from the target grating to an off incidence angle and transmits through the reference transmission grating mixed with light reflection diffracted by the target grating and then transmission diffracted by the reference transmission grating to the off incidence angle.

10. The system of claim 1, wherein the reference transmission grating comprises a one-dimensional grating.

11. The system of claim 1, wherein the target grating comprises a one-dimensional grating.

12. The system of claim 1, wherein the reference transmission grating comprises a two-dimensional grating.

13. The system of claim 1, wherein the target grating comprises a two- dimensional grating.

14. The system of claim 1, further comprising an actuator to cause a rotation displacement of the reference transmission grating relative to the target grating about an axis perpendicular to a plane of the reference transmission grating and a second plane perpendicular to the target grating.

15. The system of claim 1, wherein a one-dimensional period of the reference transmission grating is substantially equivalent to two times a one-dimensional period of the target grating.

16. The system of claim 15, wherein the illumination source is broadband so that the illumination source has low temporal coherence.

17. The system of claim 16, wherein the illumination source has a wavelength such that the target grating has a one-dimensional grating period greater than half of the wavelength and less than the wavelength.

18. The system of claim 1, wherein a one-dimensional period of the reference transmission grating is substantially equivalent to a one-dimensional period of the target grating.

19. The system of claim 18, wherein the illumination source is broadband so that the illumination source has low temporal coherence.

20. The system of claim 19, wherein the illumination source has a wavelength such that the target grating has a one-dimensional grating period greater than the wavelength and less than two times the wavelength.

21. The system of claim 1, wherein a one-dimensional period of the reference transmission grating is substantially equivalent to half a one-dimensional period of the target grating.

22. The system of claim 21, wherein the illumination source is narrowband so that the illumination source has high temporal coherence.

23. The system of claim 22, wherein the illumination source has a wavelength such that the target grating has a one-dimensional grating period greater than the wavelength and less than two times the wavelength.

24. The system of claim 1, wherein a one-dimensional period of the reference transmission grating is substantially equivalent to half a one-dimensional period of the target grating.

25. The system of claim 24, wherein the illumination source is broadband so that the illumination source has low temporal coherence, and wherein the illumination source has a delayed optical path and a non-delayed optical path.

26. The system of claim 25, wherein the illumination source has a wavelength such that the target grating has a one-dimensional grating period greater than the wavelength and less than two times the wavelength.

27. The system of claim 1, wherein:
the plurality of first pupil apertures are used to isolate diffraction orders to measure X distortions; and
the plurality of second pupil apertures are used to isolate diffraction orders to measure Y distortions.

28. The system of claim 1, wherein the pupil filter member comprises at least two pupil filers.

29. The system of claim 28, wherein the at least two pupil filters comprise a first pupil filter comprising the plurality of first pupil apertures and a second pupil filter comprising the plurality of second pupil apertures.

30. The system of claim 29, wherein the first and second pupil filters are exchangeable.

31. The system of claim 1, wherein the first direction is perpendicular to the second direction.

32. A method for a target grating measurement system, comprising:
disposing an illumination source;
disposing a reference transmission grating, wherein the illumination source is disposed to generate an incident light beam that illuminates the reference transmission grating, and wherein the reference transmission grating splits the incident light beam into a plurality of diffraction orders;
disposing a target grating, wherein the plurality of diffraction orders interrogates the target grating, wherein the target grating generates a plurality of backward diffraction beams comprising a plurality of first backward diffraction beams and a plurality of second backward diffraction beams, and wherein the reference transmission grating and the target grating are parallel;
disposing a pupil filter member comprising a plurality of first pupil apertures aligned in a first direction and a plurality of second pupil apertures aligned in a second direction different from the first direction, wherein the plurality of diffraction orders from the target grating reach the pupil filter member via the reference transmission grating, wherein the plurality of first pupil apertures pass the plurality of first backward diffraction beams entering the pupil filter member, and wherein the plurality of second pupil apertures pass the plurality of second backward diffraction beams entering the pupil filter member; and
disposing a detector, wherein the detector takes a measurement of the plurality of first backward diffraction beams and the plurality of second backward diffraction beams.

33. A method for measuring a target grating system, comprising:
generating an incident light beam using an illumination source that is disposed to illuminate a reference transmission grating, wherein the reference transmission grating is disposed to split the incident light beam into a plurality of diffraction orders, wherein the plurality of diffraction orders interrogates a target grating, wherein the target grating generates a plurality of backward diffraction beams comprising a plurality of first backward diffraction beams and a plurality of second backward diffraction beams, and wherein the reference transmission grating and the target grating are parallel;
using a pupil filter member comprising a plurality of first pupil apertures aligned in a first direction and a plurality of second pupil apertures aligned in a second direction different from the first direction to permit the plurality of first pupil apertures to pass the plurality of first backward diffraction beams entering the pupil filter member and to permit the plurality of second pupil apertures to pass the plurality of second backward diffraction beams entering the pupil filter member; and
taking, using a detector, a measurement of the plurality of first backward diffraction beams and the plurality of second backward diffraction beams.

* * * * *